US012699429B2

(12) United States Patent
Boone et al.

(10) Patent No.: US 12,699,429 B2
(45) Date of Patent: Aug. 4, 2026

(54) EXTENDED REALITY (XR) DEVICE THERMAL LOAD MANAGEMENT

(71) Applicant: INTERNATIONAL BUSINESS MACHINES CORPORATION, Armonk, NY (US)

(72) Inventors: Michael Boone, Lutz, FL (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 18/465,264

(22) Filed: Sep. 12, 2023

(65) Prior Publication Data

US 2025/0085752 A1      Mar. 13, 2025

(51) Int. Cl.
| | |
|---|---|
| *G06F 1/20* | (2006.01) |
| *G06F 1/3206* | (2019.01) |
| *G06F 11/34* | (2006.01) |

(52) U.S. Cl.
CPC ............ *G06F 1/206* (2013.01); *G06F 1/3206* (2013.01); *G06F 11/3442* (2013.01)

(58) Field of Classification Search
CPC ..... G06F 1/206; G06F 11/3442; G06F 1/3206
USPC ....................................................... 700/300
See application file for complete search history.

(56) References Cited

U.S. PATENT DOCUMENTS

| | | | | |
|---|---|---|---|---|
| 7,327,571 | B2 * | 2/2008 | Giardina | ................... G06F 1/20 |
| | | | | 174/15.2 |
| 2007/0053161 | A1 * | 3/2007 | Giardina | ................... G06F 1/20 |
| | | | | 257/E23.08 |

| | | | | |
|---|---|---|---|---|
| 2015/0106640 | A1 * | 4/2015 | Brackman | ............. G06F 9/5094 |
| | | | | 713/324 |
| 2016/0124476 | A1 * | 5/2016 | Mittal | ...................... G06F 1/324 |
| | | | | 713/320 |
| 2016/0378150 | A1 * | 12/2016 | Sega | ................... G06F 11/3017 |
| | | | | 700/299 |
| 2018/0005442 | A1 * | 1/2018 | Mullins | ................ G06T 19/006 |

(Continued)

FOREIGN PATENT DOCUMENTS

| | | |
|---|---|---|
| JP | 7184413 B1 | 12/2022 |
| JP | 2022550961 A | 12/2022 |

(Continued)

OTHER PUBLICATIONS

Ethirajulu, Balaji, "How 5G and Edge Computing can enhance virtual reality," Ericsson, downloaded from the internet Jun. 23, 2023, 8 pages.

(Continued)

*Primary Examiner* — Chun Cao

(74) *Attorney, Agent, or Firm* — James L. Olsen

(57) ABSTRACT

Aspects of the present disclosure relate to extended reality (XR) device thermal load management. Thermal data associated with an XR device can be received. A determination can be made that a condition is met for offloading a thermal load of the XR device. One or more edge processing devices within the environment of the XR device can be identified. At least one edge processing device with sufficient computing resources for balancing the thermal load of the XR device can be selected. The XR device can be instructed to offload the thermal load to the selected at least one edge processing device.

17 Claims, 4 Drawing Sheets

(56) References Cited

U.S. PATENT DOCUMENTS

| | | | | |
|---|---|---|---|---|
| 2018/0039519 | A1* | 2/2018 | Kumar | G06F 9/4812 |
| 2018/0329465 | A1 | 11/2018 | Tavakoli et al. | |
| 2019/0208007 | A1 | 7/2019 | Khalid | |
| 2019/0243685 | A1* | 8/2019 | Guim Bernat | G06F 1/30 |
| 2020/0033921 | A1* | 1/2020 | Rohena | G05B 15/02 |
| 2022/0060957 | A1* | 2/2022 | Shuman | H04W 88/06 |
| 2022/0256647 | A1* | 8/2022 | Salmasi | H04L 67/12 |
| 2022/0272578 | A1 | 8/2022 | Luo | |
| 2022/0360645 | A1 | 11/2022 | Badic et al. | |
| 2022/0386252 | A1 | 12/2022 | Lee et al. | |
| 2023/0400975 | A1* | 12/2023 | Gudivada | G06F 3/0482 |
| 2024/0214011 | A1* | 6/2024 | Ray | G06F 1/206 |

FOREIGN PATENT DOCUMENTS

| | | | | | |
|---|---|---|---|---|---|
| WO | | 2022/170156 | A1 | 8/2022 | |
| WO | | WO-2024039392 | A1 * | 2/2024 | G06F 3/013 |

OTHER PUBLICATIONS

Lee et al., "Thermo-Haptic Materials and Devices for Wearable Virtual and Augmented Reality," Advanced Functional Materials, 2021, pp. 1-20.

Schmoll, R. S. et al., "Demonstration of VR / AR Offloading to Mobile Edge Cloud for Low Latency 5G Gaming Application," 2018 15th IEEE Annual Consumer Communications & Networking Conference (CCNC), 2018, pp. 1-3.

International Searching Authority, "Notification of Transmittal of the International Search Report and the Written Opinion of the International Searching Authority, or Declaration," Patent Cooperation Treaty, Nov. 21, 2024, 12 pages, International Application No. PCT/EP2024/073012.

* cited by examiner

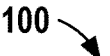

100

COMPUTER  101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

XR DEVICE THERMAL MANAGEMENT CODE
150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

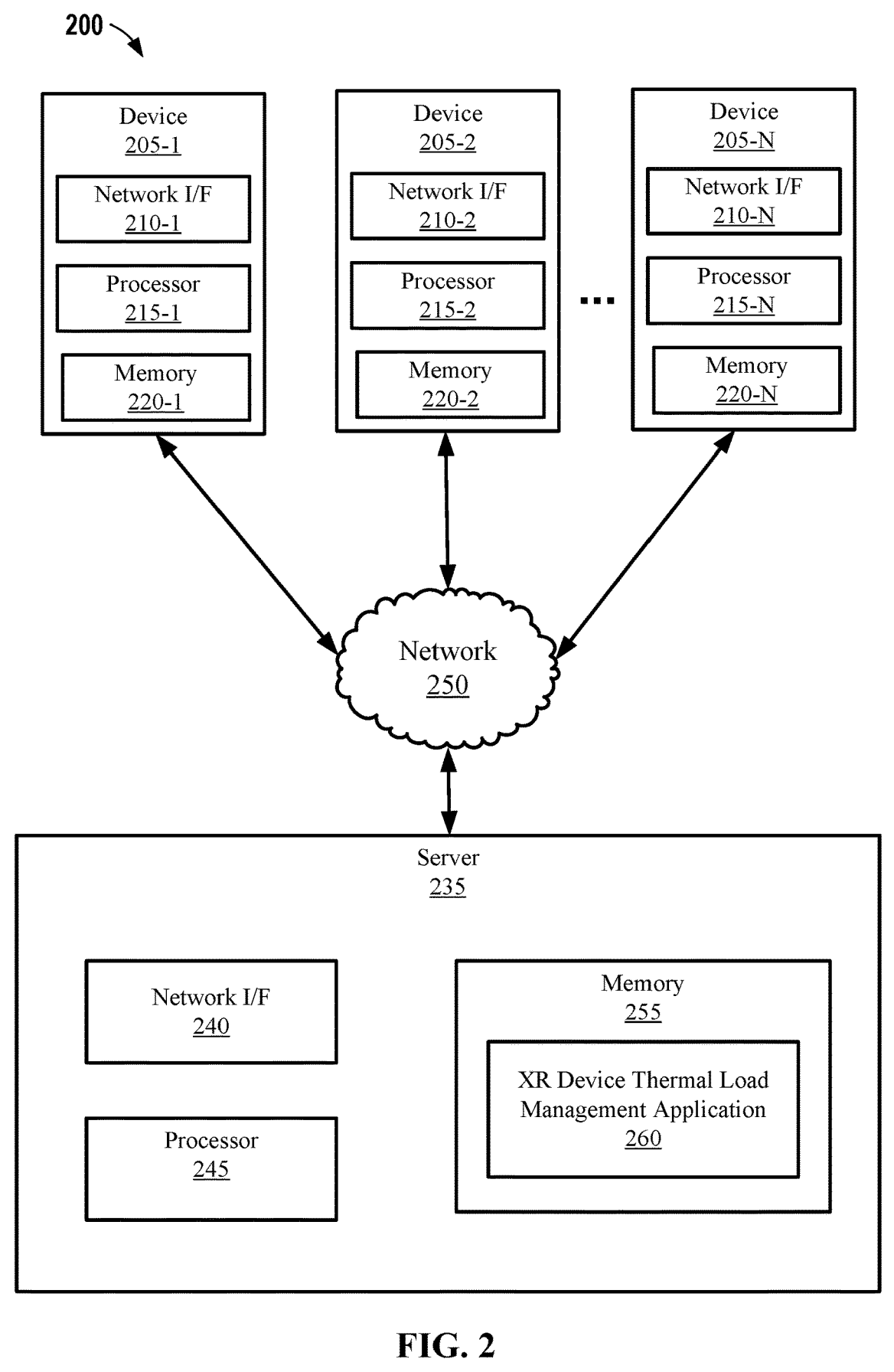

| Device 205-1 |
| --- |
| Network I/F 210-1 |
| Processor 215-1 |
| Memory 220-1 |

| Device 205-2 |
| --- |
| Network I/F 210-2 |
| Processor 215-2 |
| Memory 220-2 |

...

| Device 205-N |
| --- |
| Network I/F 210-N |
| Processor 215-N |
| Memory 220-N |

Network 250

Server 235

| Network I/F 240 |
| --- |

| Processor 245 |
| --- |

Memory 255

XR Device Thermal Load Management Application 260

FIG. 2

EXTENDED REALITY (XR) DEVICE THERMAL LOAD MANAGEMENT

BACKGROUND

The present disclosure relates generally to the field of computing, and in particular, to extended reality (XR) devices.

Extended reality (XR) technology includes augmented reality (AR), virtual reality (VR), and mixed reality (MR). XR technologies utilize various sensors and display technologies to provide users with an immersive virtualized experience, which may include real-world and/or simulated elements.

AR systems can include wearable computer-capable devices that generate virtual objects, such as three-dimensional images, text, animations, and videos, to overlay onto the wearer's field of vision to enable the wearer to view and interact with the virtual objects. AR devices can track position and orientation of a user such that alignment between virtual objects rendered on an AR display and the real world can be attained.

VR systems provide sensory data (e.g., audio, haptic, and visual data) to users such that the users experience an immersive environment. VR systems typically include a wearable display (e.g., a head-mounted display (HMD) or glasses) used to visualize a simulated environment. The simulated environment can be similar to the real world or entirely fictional.

MR systems enable the merging of real-world environments and computer-generated environments. Physical and virtual objects can co-exist in MR environments and interact in real-time.

SUMMARY

Aspects of the present disclosure relate to a computer program product, system, and method for extended reality (XR) device thermal load management.

Thermal data associated with an XR device can be received. A determination can be made that a condition is met for offloading a thermal load of the XR device. One or more edge processing devices within the environment of the XR device can be identified. At least one edge processing device with sufficient computing resources for balancing the thermal load of the XR device can be selected. The XR device can be instructed to offload the thermal load to the selected at least one edge processing device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 1 is a high-level block diagram illustrating an example computer system and network environment that can be used in implementing one or more of the methods, tools, modules, and any related functions described herein, in accordance with embodiments of the present disclosure.

FIG. 2 is block diagram illustrating an example network environment, in accordance with embodiments of the present disclosure.

Figure 3:
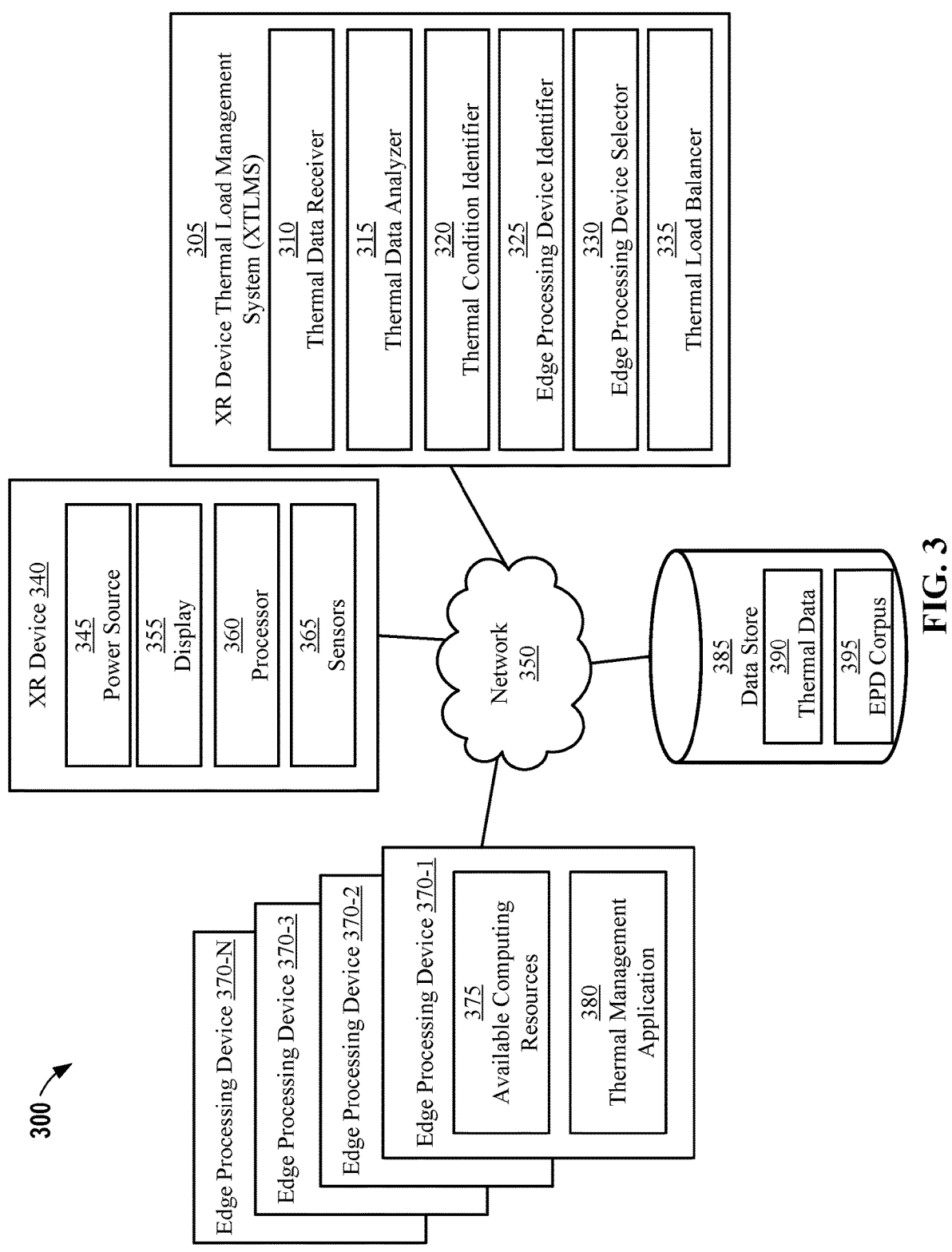
FIG. 3 is a block diagram illustrating an example network environment including an extended reality (XR) device thermal load management system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to XR device thermal load management. While the present disclosure is not necessarily limited to such applications, various aspects of the disclosure may be appreciated through a discussion of various examples using this context.

As discussed above, extended reality (XR) technology includes mixed reality (MR), virtual reality (VR), and augmented reality (AR). XR technologies utilize various sensors and display technologies to provide users with an immersive virtualized experience, which may include real-world and/or simulated elements. AR systems can include wearable computer-capable devices that generate virtual objects, such as three-dimensional images, text, animations, and videos, to overlay onto the wearer's field of vision to enable the wearer to view and interact with the virtual objects. VR systems provide sensory data (e.g., audio, haptic, and visual data) to users such that the users experience a semi or fully immersive environment. MR systems enable the merging of real-world environments and computer-generated environments. XR technology has many applications, including gaming, education, training, and visualization, among others.

Due to the processing intensive nature of XR technologies, a significant amount of heat can be generated during usage. Further, as implementations of XR technology shift to wireless, the source of heat (e.g., the power source, processing units, memory units, etc. of the XR device) becomes closer to the user. In certain scenarios, the heat generated during usage of an XR device can cause discomfort or injury. For example, excessive heat generated during XR device usage can lead to skin irritation, sweating, discomfort, and heat exhaustion. While taking breaks from XR device usage can address the above issues, other solutions for managing heat generated by XR devices are needed.

The following description provides examples of embodiments of the present disclosure, and variations and substitutions may be made in other embodiments. Several examples will now be provided to further clarify various aspects of the present disclosure.

Example 1: A computer-implemented method for extended reality (XR) device thermal load management. The method comprises receiving thermal data associated with an extended reality (XR) device. The method further comprises determining that a condition is met for offloading a thermal load of the XR device. The method further comprises identifying one or more edge processing devices within an environment of the XR device. The method further comprises selecting at least one edge processing device of the one or more edge processing devices with sufficient computing resources for balancing the thermal load of the XR device. The method further comprises instructing the XR device to offload the thermal load to the selected at least one edge processing device.

The above limitations advantageously enable balancing a thermal load of an XR device by utilizing edge processing devices within an environment of the XR device. Various conditions can be set for determining whether to balance the thermal load of the XR device. Thus, processing efficiency is enhanced as balancing the thermal load of the XR device may only be completed in response to determining that a condition is met. Aspects of the present disclosure can enhance comfort of a user of the XR device by reducing heat generated by components of the XR device. This may also increase the time period that the user can use the XR device. Further, longevity of the XR device can be increased by maintaining components of the XR device (e.g., the CPU, GPU, memory units, circuit board, etc.) within healthier temperature ranges.

Example 2: The limitations of Example 1, where determining that the condition is met for offloading the thermal load of the XR device includes comparing a temperature sensor value associated with the XR device within the thermal data to a temperature threshold and determining that the condition is met in response to the temperature sensor value satisfying the temperature threshold. The above limitations advantageously reduce temperature of the XR device, which may reduce discomfort of a user using the XR device and increase the time period that the XR device can be used. Further, the above limitations can increase longevity of the XR device by maintaining components of the XR device (e.g., the CPU, GPU, memory units, circuit board, etc.) within healthier temperature ranges.

Example 3: The limitations of any of Examples 1-2, where determining that the condition is met for offloading the thermal load of the XR device includes comparing a biometric sensor value associated with a user of the XR device within the set of thermal data to a biometric data threshold and determining that the condition is met in response to the biometric sensor value satisfying the biometric data threshold. The above limitations advantageously reduce temperature of the XR device, which may reduce discomfort of a user using the XR device and increase the time period that the XR device can be used. Further, because the condition can be set based on biometric data of the user, the condition may reflect the actual state of the user (e.g., the current heart rate or perspiration level of the user). This can serve as an accurate indicator for improving comfort level of the user by offloading the thermal load of the XR device.

Example 4: The limitations of Example 3, where the biometric sensor value is a heart rate sensor value, where the biometric data threshold is a heart rate threshold. The above limitations advantageously reduce temperature of the XR device, which may reduce discomfort of a user using the XR device and increase the time period that the XR device can be used. Further, because the condition can be set based on the heart rate of the user, the condition reflects the actual state of the user. This can serve as an accurate indicator for improving comfort level of the user by offloading the thermal load of the XR device.

Example 5: The limitations of any of Examples 3-4, where the biometric sensor value is a sweat analyte quantity value, wherein the biometric data threshold is a sweat analyte quantity threshold. The above limitations advantageously reduce temperature of the XR device, which may reduce discomfort of a user using the XR device and increase the time period that the XR device can be used. Further, because the condition can be set based on the perspiration level of the user, the condition reflects the actual state of the user. This can serve as an accurate indicator for improving comfort level of the user by offloading the thermal load of the XR device.

Example 6: The limitations of any of Examples 1-5, where determining that the condition is met for offloading the thermal load of the XR device includes detecting at least one keyword associated with the condition uttered by a user of the XR device during XR usage and determining that the condition is met in response to detecting the at least one keyword. The above limitations advantageously reduce temperature of the XR device, which may reduce discomfort of a user using the XR device and increase the time period that the XR device can be used. Further, because the condition can be set based on detected speech uttered by the user, the condition may reflect the state of the user. For example, if the user utters the keyword "hot" or the key phrase "I am hot," the thermal load of the XR device can be offloaded to nearby edge processing devices to reduce the temperature of the XR device. This can serve as an accurate indicator for improving comfort level of the user by offloading the thermal load of the XR device.

Example 7: The limitations of any of Examples 1-6, where the method further comprises, in response to identifying one or more edge processing devices within an environment of the XR device, determining available memory resources of each of the one or more edge processing devices and determining available processing resources of each of the one or more edge processing devices. The above limitations advantageously allow accurate identification of edge processing devices which may have suitable computing resources for balancing the thermal load of the XR device.

Example 8: The limitations of Example 7, where selecting the at least one edge processing device of the one or more of edge processing devices with sufficient computing resources for balancing the thermal load of the XR device includes determining that the at least one edge processing device has a sufficient amount of available memory resources, a sufficient amount of available processing resources, and a sufficient amount of available network resources for balancing the thermal load of the XR device. The above limitations advantageously enable accurate selection of at least one edge processing device that meets sufficient computing requirements for balancing the thermal load of the XR device.

Example 9: A system comprising one or more processors and one or more computer-readable storage media collectively storing program instructions which, when executed by the one or more processors, are configured to cause the one or more processors to perform a method according to any one of Examples 1-8. The above limitations advantageously enable a system comprising one or more processors to perform and realize the advantages described with respect to Examples 1-8.

Example 10: A computer program product comprising one or more computer readable storage media, and program instructions collectively stored on the one or more computer readable storage media, the program instructions comprising instructions configured to cause one or more processors to perform a method according to any one of Examples 1-8. The above limitations advantageously enable a computer program product having program instructions configured to cause one or more processors to perform and realize the advantages described with respect to Examples 1-8.

Example 11: A computer-implemented method, system, or computer program product for XR device thermal load management. The method, system, or computer program product comprises receiving thermal data associated with an extended reality (XR) device, where the thermal data includes a temperature sensor value associated with the XR device. The method, system, or computer program product further comprises determining that a condition is met for offloading a thermal load of the XR device, where determining that the condition is met includes comparing the temperature sensor value associated with the XR device to a temperature threshold and determining that the condition is met in response to the temperature sensor value satisfying the temperature threshold. The method, system, or computer program product further comprises identifying one or more edge processing devices within an environment of the XR device. The method, system, or computer program product further comprises determining available memory resources of each of the one or more edge processing devices and determining available processing resources of each of the one or more edge processing devices. The method further comprises selecting at least one edge processing device of the one or more edge processing devices with sufficient computing resources for balancing the thermal load of the XR device by determining that the at least one edge processing device has a sufficient amount of available memory resources, a sufficient amount of available processing resources, and a sufficient amount of available network resources for balancing the thermal load of the XR device. The method, system, or computer program product further comprises instructing the XR device to offload the thermal load to the selected at least one edge processing device.

Example 11 advantageously realizes the benefits described with respect to Examples 1-2 and 7-10. The above limitations can be utilized within augmented reality, virtual reality, and mixed reality devices to reduce the temperature of such devices during use. The above limitations can utilize nearby edge processing devices to balance the thermal load of the above referenced types of XR devices by ensuring that the edge processing devices meet minimum computing requirements for balancing the thermal load.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as extended reality (XR) device thermal management code 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and XR device thermal management code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in XR device thermal management code 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in XR device thermal management code 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a block diagram illustrating an example computing environment 200 in which illustrative embodiments of the present disclosure can be implemented. Computing environment 200 includes a plurality of devices 205-1, 205-2, . . . , 205-N (collectively devices 205), at least one server 235, and a network 250.

The devices 205 and the server 235 include one or more processors 215-1, 215-2, . . . , 215-N (collectively processors 215) and 245 and one or more memories 220-1, 220-2, . . . , 220-N (collectively memories 220) and 255, respectively. The processors 215 and 245 can be the same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2, . . . , 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, extended reality (XR) software, etc.). For example, devices 205 and/or server 235 can be, or include, components/devices such as those described with respect to peripheral device set 114 of FIG. 1. The devices 205 and/or the server 235 can be servers, desktops, laptops, or hand-held devices. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes an extended reality (XR) device thermal load management application (XTLMA) 260. The XTLMA 260 can be configured to manage a thermal load of an XR device by utilizing one or more edge processing devices within an environment of the XR device. Edge computing is a distributed computing paradigm that brings computation and data storage closer to sources of data. As discussed herein, "edge processing devices" refer to devices within an environment of (e.g., within a predetermined distance from, proximate to, sharing a wireless network with, etc.) an XR device. As an example, the device 205-2 may be an edge processing device within an environment of an XR device 205-1. In this example, XTLMA 260 can be configured to reallocate computing tasks of the XR device 205-1 to the edge processing device 205-2, thereby reducing the thermal load of the XR device. Edge processing devices may share a local network (e.g., via a wired or wireless connection) with the XR device such that the processed XR data can be received and used by the XR device with little to no delay (based on processing and data transfer time).

The XTLMA 260 can be configured to receive thermal data associated with an XR device (e.g., a VR, AR, and/or MR device). The thermal data can include historical and/or current thermal data associated with the XR device. The thermal data can include temperature readings from temperature sensors within various components (e.g., the central processing unit (CPU), graphical processing unit (CPU), circuit board, battery, power supply, storage drives, memory units, etc.) of the XR device. Thermal data can also include ambient temperature in the environment of the XR device. In embodiments, thermal data can include fan speed and airflow data associated with the XR device.

Thermal data can also include other data not specifically related to temperature of the XR device but relevant for determining whether to offload the thermal load of the XR device to edge processing devices. For example, thermal data can include biometric data of a user currently utilizing the XR device, such as data collected from a sweat sensor (e.g., a flexible electrochemical sensor configured to detect and quantify perspiration) or heart rate sensor. In embodiments, thermal data can include speech data uttered by the user of the XR device related to temperature and activity level of the user during XR device usage.

The XTLMA 260 can be configured to analyze the thermal data associated with the XR device to determine whether a condition is met for offloading a thermal load of the XR device. As discussed herein, "offloading a thermal load" of the XR device refers to reallocating (e.g., redistributing) processing, input/output (I/O), and/or memory tasks of the XR device to one or more edge processing devices within an environment of the XR device. Various conditions can be set for determining to offload the thermal load of the XR device. In embodiments, conditions can be set based on temperature thresholds. For example, a current temperature of one or more components (e.g., a current GPU temperature sensor value) of the XR device can be compared to a temperature threshold to determine whether to offload the thermal load of the XR device. In embodiments, conditions can be set based on biometric data of the user of the XR device. For example, sweat data (e.g., sweat analyte quantity) and/or heart rate data of a user during XR usage can be compared to one or more thresholds to determine to offload a thermal load of the XR device. In embodiments, conditions can be set based on recognized speech. For example, one or more keywords or key phrases (e.g., "hot") can be tied to conditions for offloading the thermal load of the XR device to surrounding edge processing devices. However, any suitable conditions can be set for determining whether to offload the thermal load of the XR device to edge processing devices.

Upon determining that a condition is met for offloading a thermal load of the XR device, edge processing devices within the environment of the XR device can be identified. Edge processing devices can be identified in any suitable manner. For example, edge processing devices can be identified based on devices sharing a wireless network (e.g., network 250) with the XR device.

Available computing resources of each identified edge processing device can be determined for use in selecting one or more edge processing devices to balance the thermal load of the XR device. Determining available computing resources can include inspecting current execution/utilization of each edge processing device to determine available memory resources (e.g., random access memory (RAM)) based on currently utilized memory as compared to memory capacity) of each edge processing device, available processing resources (e.g., CPU and GPU availability) of each edge processing device, available network resources (e.g., available network bandwidth) of each edge processing device, and/or available input/output (I/O) bandwidth of each edge processing device.

The XTLMA 260 can then be configured to select one or more edge processing devices with sufficient computing resources for balancing the thermal load of the XR device. For example, a minimum amount of memory resources, processing resources, I/O bandwidth, and/or network resources required to successfully reduce the thermal load of the XR device (e.g., below a predetermined level) can be determined. Thereafter, the XTLMA 260 can be configured to select one or more edge processing devices which fulfill the minimum amount of memory resources, processing resources, I/O bandwidth, and/or network resources required to balance the thermal load of the XR device. The minimum amount of computing resources can consider the current temperature of the XR device and the current utilization of components within the XR device. It is noted that a "minimum amount of computing resources" need not necessarily be the literal minimum amount of computing resources required, but can also be a reduced amount of computing resources relative to a previous amount of computing resources and based on the observed and/or anticipated needs. In other words, the minimum amount of computing resources can be a tolerance applied to ensure an adequate level of reliability or performance for balancing the thermal load.

The XTLMA 260 can then be configured to instruct the XR device to offload the thermal load to the selected edge processing device(s). This can include offloading processing and memory tasks to the selected edge processing devices to reduce the amount of processing that the XR device is required to complete, thereby reducing the temperature of the XR device.

It is noted that FIG. 2 is intended to depict the representative major components of an example computing environment 200. In some embodiments, however, individual components can have greater or lesser complexity than as represented in FIG. 2, components other than, or in addition to, those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., thermal and biometric data), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Referring now to FIG. 3, shown is a block diagram illustrating an example network environment 300 in which illustrative embodiments of the present disclosure can be implemented. The network environment 300 includes an XR device thermal load management system (XTLMS) 305, an XR device 340, edge processing devices 370-1, 370-2, 370-3 . . . 370-N (collectively "edge processing devices 370"), and a data store 385, each of which can be communicatively coupled for intercomponent interaction via a network 350. In embodiments, the network 350 can be the same as, or substantially similar to, network 250 and/or WAN 102. In embodiments, the edge processing devices 370, XTLMS 305, and/or XR device 340 can be the same as, or substantially similar to, computer 101, peripheral device set 114, end user device 103, devices 205, and/or server 235.

The XR device 340 includes a power source 345 (e.g., a battery or power supply unit (PSU)), a display 355 (e.g., a screen for displaying digital content), a processor 360, and sensors 365 (e.g., a front facing camera, temperature sensors, air flow sensors, microphones, tracking sensors, fan sensors, etc.). The XR device 340 can be a virtual reality (VR) device, an augmented reality (AR) device, or a mixed reality (MR) device. The XR device 340 may include components found in smartphones, tablet computers, and other modern computer technology. XR graphical rendering may be performed by optical projection systems, monitors, handheld devices, graphical processing units, and/or display systems worn on the human body. The XR device 340 can include a head-mounted display (HMD), such as a harness or a helmet which can support XR device 340 interface to a human body.

In embodiments, XR device 340 can be an augmented reality (AR) device. For example, the XR device can be a wearable computer-capable device that generates digital information, such as three-dimensional images, text, animations, and videos, to overlay into the wearer's field of vision so the digital information is viewable along with real world scenes in the wearer's field of vision. In embodiments, XR device 340 may be implemented as eyeglasses and employ cameras to capture real world views such that XR imagery can be displayed on the display 355 in particular locations. In embodiments, the XR device 340 can include a head-up display (HUD), which can be a transparent display that presents data without requiring users to look away from their usual viewpoints. XR device 340 can additionally or alternatively be implemented as contact lenses and/or virtual retinal displays, where a display is superimposed directly over the retina of a viewer's eye. Sensors 365 of XR device 340 can include, among others potential sensors, digital cameras and/or other optical sensors, accelerometers, a global positioning system (GPS), gyroscopes, solid state compasses, and radio-frequency identification (RFID). Sensors 365 can include a plurality of temperature sensors associated with various components within the XR device 340. For example, each of the power source 345, processor 360 (e.g., CPU and GPU), memory units (not shown), and/or main board (not shown) can have one or more temperature sensors configured to measure the temperature of their respective components during XR usage. The XR device 340 can include one or more fans and corresponding fan speed sensors configured to output fan speed (e.g., in rotations per minute (RPM)). The XR device 340 can additionally include air flow sensors.

In embodiments, the XR device 340 can be configured to perform six degrees of freedom monitoring that allows the XR device 340 to align virtual information to the physical world and adjust accordingly with the XR user's head movements. The XR device 340 may also implement gesture controls for enhanced immersion.

In embodiments, the XR device 340 can be implemented as a virtual reality (VR) device. For example, the XR device 340 can be configured to provide sensory data (e.g., audio, visual, and haptic data) to a user such that the user can experience an immersive environment. In embodiments, sensors 365 can include one or more sensors configured to track a user's movement within a virtual boundary. This can be completed such that the user's position within the virtual environment can be updated in real-time while immersed in VR. Examples of sensors that can be used to aid in facilitating an immersive virtual environment include gyroscopes, accelerometers, magnetometers, cameras, eye-tracking sensors, light detection and ranging (LIDAR) sensors, and others.

The XTLMS 305 can be configured to manage a thermal load of the XR device 340 by reallocating tasks of the XR device 340 to edge processing devices 370. XTLMS 305 includes a thermal data receiver 310, a thermal data analyzer 315, a thermal condition identifier 320, an edge processing device identifier 325, an edge processing device selector 330, and a thermal load balancer 335. The functionalities of the thermal data receiver 310, thermal data analyzer 315, thermal condition identifier 320, edge processing device identifier 325, edge processing device selector 330, and thermal load balancer 335 can be processor-executable instructions that can be executed by a dedicated or shared processor using received inputs.

The thermal data receiver 310 can be configured to receive thermal data associated with the XR device 340. The thermal data can include historical and/or current thermal data associated with the XR device, which may be stored as thermal data 390 within data store 385. The thermal data 390 can include temperature readings from temperature sensors 365 within various components of the XR device 340. The temperature sensors 365 can include temperature sensors associated with the CPU (e.g., processor 360), GPU (e.g., processor 360), circuit board, battery (e.g., power source 345), power supply unit (e.g., power source 345), storage drives, memory units, display 355, and other components within XR device 340. In embodiments, thermal data 390 can include ambient temperatures in the environment of the XR device. Ambient temperature can be measured by one or more external sensors, such as a thermostat temperature sensor. In embodiments, thermal data 390 can include fan speed and airflow data associated with the XR device 340.

Thermal data 390 can also include other data not specifically related to temperature of the XR device 340 but relevant for determining whether to offload the thermal load of the XR device 340 to edge processing devices 370. For example, thermal data 390 can include biometric data of a user currently utilizing the XR device 340. In embodiments the biometric data can include sensor readings from a sweat sensor (not shown). A sweat sensor is a flexible electrochemical sensor configured to detect and quantify perspiration when coupled to a user. Sweat sensors can provide data regarding the amount of perspiration a user generates as well as types of analytes detected within the user's sweat. This data can be used for determining whether to offload the thermal load of the XR device 340 to surrounding edge processing devices 370. In embodiments, biometric data can include heart rate data of the user during XR usage. Heart rate data can indicate activity level of the user and thus be used to determine whether to offload a thermal load of the XR device 340. Heart rate data can be collected by a heart rate sensor (not shown). In embodiments, thermal data 390 can include speech data uttered by the user of the XR device 340 related to temperature and activity level of the user during XR device 340 usage. Speech data can be collected by a microphone (not shown), which may be external to, or integrated within, XR device 340.

Thermal data analyzer 315 can be configured to analyze the thermal data 390 associated with the XR device 340 and/or the environment of the XR device 340. Thermal data analyzer 315 can be configured to pre-process, organize, format, or otherwise handle thermal data 390. In embodiments, the thermal data analyzer 315 can be configured to perform statistical analyses on historical and/or current thermal data 390. For example, the thermal data analyzer 315 can be configured to calculate an average temperature value, median temperature value, and/or range of temperature values for temperature sensor 365 readings of any given XR device 340 component over any suitable time range. In embodiments, the thermal data analyzer 315 can be configured to process biometric data. In embodiments, thermal data analyzer 315 can be configured to perform natural language processing (NLP) on speech data. NLP techniques can include, among other techniques, speech recognition, speech segmentation, tokenization, morphological analysis (e.g., lemmatization, segmentation, part-of-speech tagging, stemming, etc.), syntactic analysis (e.g., parsing, sentence breaking, etc.), semantic analysis (e.g., named entity recognition (NER), terminology extraction, sentiment analysis, entity linking, etc.), text classification, and discourse analysis (e.g., topic segmentation and recognition, coreference resolution, implicit semantic role labeling, etc.). In embodiments, NLP can be used to identify keywords or key phrases associated with thermal conditions.

Thermal condition identifier 320 can be configured to determine whether a condition is met for offloading a thermal load of the XR device 340 to edge processing devices 370. Various conditions can be set for determining to offload the thermal load of the XR device 340. Reference will now be made to various conditions that can be set to dictate whether to offload a thermal load of the XR device 340. The following conditions are merely exemplary, and any suitable conditions for offloading the thermal load of the XR device 340 can be implemented without departing from the spirit and scope of the present disclosure.

In embodiments, conditions can be set based on temperature thresholds. For example, a current temperature of one or more components (e.g., a current GPU temperature value) of the XR device 340 can be compared to a temperature threshold to determine whether to offload the thermal load of the XR device 340. In response to the temperature threshold being satisfied (e.g., being exceeded), a determination can be made that the thermal load of the XR device 340 should be offloaded to nearby edge processing devices 370. In embodiments, a condition can be set such that the temperature value of multiple components (e.g., the GPU and battery) are required to exceed one or more respective thresholds in order to offload a thermal load of the XR device 340. In embodiments, conditions can be set based on average temperature values. For example, a condition can be set based on the average temperature value of a given component over a given time period (e.g., an average GPU temperature over the last 5 minutes). In response to the average temperature of the XR device 340 component satisfying (e.g., exceeding) a temperature threshold, a determination can be made to offload the thermal load of the XR device 340. In some embodiments, conditions can be set based on the average temperature across multiple XR device 340 components (e.g., the average temperature between the CPU and GPU over the last 5 minutes). In embodiments, conditions can be set based on the ambient temperature of the environment in which XR usage is occurring. In response to the ambient temperature satisfying a temperature threshold (e.g., exceeding), a determination can be made to offload the thermal load of the XR device 340.

Any suitable number of temperature sensor values associated with any suitable XR device 340 components can be implemented into conditions for offloading the thermal load of the XR device 340. Any suitable magnitude and/or number of temperature thresholds can be implemented into conditions for offloading the thermal load of the XR device 340.

In embodiments, conditions for offloading the thermal load of the XR device 340 can be set based on the biometric data described above. As an example, sweat data, such as sweat analyte quantity, can be integrated into conditions for offloading thermal data of the XR device 340. For example, a sweat analyte threshold can be set such that if a given sweat analyte detected by a sweat sensor is satisfied (e.g., exceeded), then a determination is made to offload the thermal load of the XR device 340. In embodiments, heart rate can be implemented into conditions for offloading the thermal load of the XR device. For example, if a heart rate threshold (e.g., expressed in beats per minute (BPM)) is satisfied (e.g., exceeded) by a user during XR usage, then a determination can be made to offload the thermal load of the XR device 340.

In embodiments, conditions for offloading the thermal load of the XR device 340 can be set based on fan speed and/or airflow data. As an example, a fan speed threshold can be set (e.g., within RPMs) such that if the speed of a fan within or otherwise associated with the XR device 340 satisfies (e.g., exceeds) a fan speed threshold, then a determination is made to offload the thermal load of the XR device 340. As another example, an airflow threshold can be set such that if airflow within or otherwise associated with the XR device 340 satisfies (e.g., falls below) the airflow threshold, then a determination is made to offload the thermal load of the XR device 340.

In embodiments, speech data uttered by the user can be implemented into conditions for offloading the thermal load of the XR device 340. For example, if any keywords or key phrases associated with conditions for offloading the thermal load of the XR device 340 are detected during XR usage (e.g., via a microphone), then a determination can be made to offload the thermal load of the XR device 340. Example keywords or key phrases that can be tied to conditions for offloading the thermal load of the XR device include: "hot," "sweaty," "tired," "exhausted," "burning," "warm," etc.

Upon determining that a condition is met for offloading the thermal load of the XR device 340, edge processing device identifier 325 can be configured to identify edge processing devices 370 within the environment of the XR device 340. Edge processing devices 370 can be identified in any suitable manner. For example, edge processing devices 370 can be identified based on devices sharing a wireless network (e.g., network 250) with the XR device 340. A list of devices sharing a wireless network with the XR device 340 can be discovered by analyzing the wireless network, for example, using a wireless network management application (not shown). In some embodiments, edge processing devices 370 can be determined using IoT sensors (e.g., cameras, not shown) within an environment of the XR device 340. In some embodiments, edge processing devices 370 can be identified based on a user-defined list of edge processing devices. However, the edge processing devices 370 can be identified in any other suitable manner. In embodiments, identified edge processing devices 370 can be stored within edge processing device (EDP) corpus 395.

In embodiments, subsets of edge processing devices can be mapped to particular locations (e.g., zones or geofences). For example, a first set of edge processing devices can be associated with a first room, building, or other type of zone, and a second set of edge processing devices can be associated with a second room, building, or other type of zone. Associations between zones and edge processing devices can be stored within EDP corpus 395. In embodiments, identifying edge processing devices 370 can include ascertaining a current zone (e.g., location) of the user of the XR device 340 and identifying all edge processing devices within the current zone. In embodiments, mobility of the user can be tracked (e.g., via GPS or other location sensors) such that suitable edge processing devices 370 associated with the current zone of the user can be identified.

Each edge processing device 370 can include a thermal management application 380 configured to interface the with XTLMS 305. In embodiments, user configuration settings of edge processing devices can be configured via respective thermal management applications 380 of edge processing devices 370.

The edge processing device selector 330 can be configured to determine available computing resources 375 of each identified edge processing device 370 for use in selecting one or more edge processing devices 370 to balance the thermal load of the XR device 340. Determining available computing resources 375 can include inspecting current execution/utilization of each edge processing device 370 to determine available memory resources (e.g., random access memory (RAM)) based on currently utilized memory as compared to memory capacity) of each edge processing device 370, available processing resources (e.g., CPU and GPU availability) of each edge processing device 370, available network resources (e.g., available network bandwidth) of each edge processing device 370, and/or available input/output (I/O) bandwidth of each edge processing device 370.

In embodiments, the edge processing devices 370 can be ranked based on available computing resources 375, where devices having greater amounts of computing resources are ranked higher than devices having lesser amounts of computing resources. For example, a highest ranked edge processing device can have the highest amount of available memory resources, processing resources, and/or network resources. In this example, the highest ranked edge processing device(s) with sufficient computing resources to balance the thermal load of the XR device 340 can be selected by edge processing device selector 330. In embodiments, rankings of edge processing devices 370 can be stored within EDP corpus 395.

The edge processing device selector 330 can then be configured to select one or more edge processing devices 370 with sufficient computing resources for balancing the load of the XR device 340. For example, a minimum amount of memory resources, processing resources, I/O bandwidth, and/or network resources required to successfully reduce the thermal load of the XR device 340 (e.g., below a predetermined level) can be determined. Thereafter, the edge processing device selector 330 can be configured to select one or more edge processing devices 370 which fulfill the minimum amount of memory resources, processing resources, I/O bandwidth, and/or network resources required to balance the thermal load of the XR device 340.

The sufficient (e.g., minimum) amount of computing resources can consider the current temperature of the XR device 340 and the current utilization of components within the XR device 340. As an example, if a current GPU temperature within the XR device is 85° C., and a predefined temperature threshold for offloading the thermal load of the XR device 340 based on GPU temperature is set to 70° C., one or more edge processing devices 370 with sufficient computing resources for bringing the GPU temperature within the XR device 340 from 85° C. to below 70° C. can be selected. In embodiments, selecting the appropriate number and/or type of edge processing devices can consider ensuring that all components of the XR device 340 are within a healthy temperature range (e.g., a recommended operating temperature range based on product specifications of each component). For example, edge processing devices 370 can be selected based on reducing the temperature of the CPU, GPU, memory units, storage drives, circuit board, and power source 345 of the XR device 340 into a healthy temperature range (e.g., which can vary based on each component). In some embodiments, edge processing devices 370 can be selected based on reducing the utilization of the components within the XR device 340 (e.g., processor utilization, memory utilization, GPU utilization, video RAM, etc.) below pre-defined levels (e.g., which can vary based on the component).

The thermal load balancer 335 can then be configured to instruct the XR device 340 to offload the thermal load to the selected edge processing device(s) 370. This can include offloading processing and memory tasks to the selected edge processing devices to reduce the amount of processing that the XR device 340 is required to complete, thereby reducing the temperature of the XR device 340. In embodiments, multiple edge processing devices 370 can cooperatively balance the thermal load of the XR device 340. That is, the thermal load balancer 335 can instruct the XR device to re-allocate a first set of tasks to a first edge processing device 370-1 and a second set of tasks to a second edge processing device 370-2. The XR data processed by the respective edge processing devices 370 can then be transmitted back to the XR device 340 over the network 350 for use during XR usage.

In embodiments, feedback can be requested from the user regarding completed thermal management operations. The feedback can indicate whether the thermal management actions performed by the XTLMS 305 were helpful (e.g., reduced temperature while maintaining adequate XR performance) or unhelpful (did not sufficiently reduce temperature or negatively impacted XR performance, such as reduced framerate, lag, or other issues). The feedback can then be input into the XTLMS 305 such that modifications to thermal conditions can better match user intentions in the future. That is, negative feedback can lead to adjustments to thermal conditions, whereas positive feedback can reinforce thermal conditions. Modification to adjustment conditions, determination, and/or executions based on feedback can be completed using a machine learning algorithm (e.g., reinforcement learning).

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary.

Figure 4:
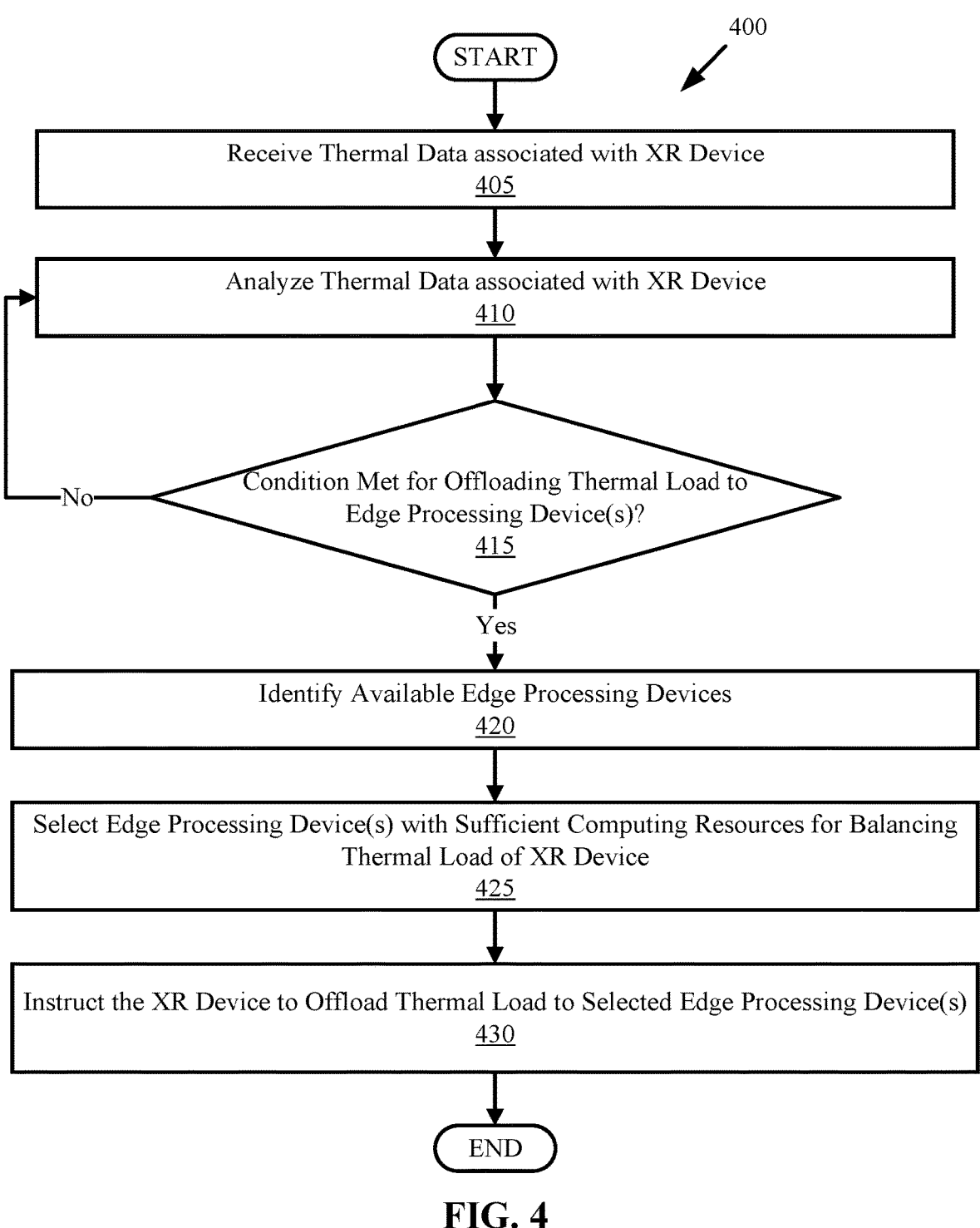
FIG. 4 is a flowchart illustrating an example method for XR device thermal load management, in accordance with embodiments of the present disclosure.

Referring now to FIG. 4, shown is a flowchart of an example method 400 for XR device thermal load management, in accordance with embodiments of the present disclosure. One or more operations of method 400 can be completed by one or more processing circuits (e.g., computer 101, devices 205, server 235, XR device 340, edge processing devices 370, XTLMS 305).

Method 400 initiates at operation 405, where thermal data associated with an XR device can be received. Any thermal data discussed with respect to thermal data receiver 310 and/or thermal data 390 can be received.

The thermal data associated with the XR device is analyzed. This is illustrated at operation 410. Analyzing thermal data can be completed in the same, or a substantially similar manner, as described with respect to the thermal data analyzer 315 of FIG. 3.

A determination is made whether a condition (e.g., a thermal condition) is met for offloading the thermal load of the XR device to edge processing devices. This is illustrated at operation 415. Conditions for offloading the thermal load of the XR device can be the same as, or substantially similar to, the conditions described with respect to the thermal condition identifier 320 of FIG. 3. If a determination is made that a condition is not met for offloading the thermal load of the XR device, then method 400 returns to operation 410, where thermal data can continue to be analyzed.

If a determination is made that a condition is met for offloading the thermal load of the XR device, method 400 proceeds to operation 420, where edge processing devices are identified. Identifying edge processing devices can be completed in the same, or a substantially similar manner, as described with respect to the edge processing device identifier 325 of FIG. 3. For example, edge processing devices can be identified based on devices sharing a wireless network with the XR device. In embodiments, edge processing devices can be identified based on a current zone of the user.

Edge processing device(s) with sufficient computing resources for balancing the thermal load of the XR device are selected. This is illustrated at operation 425. Any suitable number and/or type of edge processing devices can be selected to balance the thermal load of the XR device. Selecting edge processing devices can be completed in the same, or a substantially similar manner, as described with respect to the edge processing device selector 330 of FIG. 3. For example, a minimum number of edge processing devices to maintain temperature sensor values of components within the XR device within healthy temperature ranges can be selected for balancing the thermal load.

The XR device is then instructed to offload the thermal load to the selected edge processing devices. This is illustrated at operation 430. The XR device can then transmit required processing, memory, and/or input/output tasks over a network to the edge processing devices such that the edge processing devices can complete the tasks for the XR device prior to transmitting the processed XR data back to the XR device.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A computer-implemented method comprising:
   receiving thermal data associated with an extended reality (XR) device;
   determining that a condition is met for offloading a thermal load of the XR device;
   identifying one or more edge processing devices within an environment of the XR device, wherein in response to identifying one or more edge processing devices within the environment of the XR device:
      determining available memory resources of each of the one or more edge processing devices; and
      determining available processing resources of each of the one or more edge processing devices;
   selecting at least one edge processing device of the one or more edge processing devices with sufficient memory and processing resources for balancing the thermal load of the XR device; and
   instructing the XR device to offload the thermal load to the selected at least one edge processing device.

2. The method of claim 1, wherein determining that the condition is met for offloading the thermal load of the XR device includes:
   comparing a temperature sensor value associated with the XR device within the thermal data to a temperature threshold; and
   determining that the condition is met in response to the temperature sensor value satisfying the temperature threshold.

3. The method of claim 1, wherein determining that the condition is met for offloading the thermal load of the XR device includes:

comparing a biometric sensor value associated with a user of the XR device within the thermal data to a biometric data threshold; and
   determining that the condition is met in response to the biometric sensor value satisfying the biometric data threshold.

4. The method of claim 1, wherein determining that the condition is met for offloading the thermal load of the XR device includes:
   detecting at least one keyword associated with the condition uttered by a user of the XR device during XR usage; and
   determining that the condition is met in response to detecting the at least one keyword.

5. The method of claim 1, wherein selecting the at least one edge processing device of the one or more of edge processing devices with sufficient memory and processing resources for balancing the thermal load of the XR device includes determining that the at least one edge processing device has a sufficient amount of available memory resources, a sufficient amount of available processing resources, and a sufficient amount of available network resources for balancing the thermal load of the XR device.

6. A system comprising:
   one or more processors; and
   one or more computer-readable storage media collectively storing program instructions which, when executed by the one or more processors, are configured to cause the one or more processors to perform a method comprising:
   receiving thermal data associated with an extended reality (XR) device;
   determining that a condition is met for offloading a thermal load of the XR device;
   identifying one or more edge processing devices within an environment of the XR device, wherein in response to identifying one or more edge processing devices within the environment of the XR device:
      determining available memory resources of each of the one or more edge processing devices; and
      determining available processing resources of each of the one or more edge processing devices;
   selecting at least one edge processing device of the one or more edge processing devices with sufficient memory and processing resources for balancing the thermal load of the XR device; and
   instructing the XR device to offload the thermal load to the selected at least one edge processing device.

7. The system of claim 6, wherein determining that the condition is met for offloading the thermal load of the XR device includes:
   comparing a temperature sensor value associated with the XR device within the thermal data to a temperature threshold; and
   determining that the condition is met in response to the temperature sensor value satisfying the temperature threshold.

8. The system of claim 6, wherein determining that the condition is met for offloading the thermal load of the XR device includes:
   comparing a biometric sensor value associated with a user of the XR device within the thermal data to a biometric data threshold; and
   determining that the condition is met in response to the biometric sensor value satisfying the biometric data threshold.

9. The system of claim 8, wherein the biometric sensor value is a heart rate sensor value, wherein the biometric data threshold is a heart rate threshold.

10. The system of claim 6, wherein determining that the condition is met for offloading the thermal load of the XR device includes:

detecting at least one keyword associated with the condition uttered by a user of the XR device during XR usage; and determining that the condition is met in response to detecting the at least one keyword.

11. The system of claim 6, wherein selecting the at least one edge processing device of the one or more of edge processing devices with sufficient memory and processing resources for balancing the thermal load of the XR device includes determining that the at least one edge processing device has a sufficient amount of available memory resources, a sufficient amount of available processing resources, and a sufficient amount of available network resources for balancing the thermal load of the XR device.

12. A computer program product comprising one or more computer readable storage media, and program instructions collectively stored on the one or more computer readable storage media, the program instructions comprising instructions configured to cause one or more processors to perform a method comprising:

receiving thermal data associated with an extended reality (XR) device;

determining that a condition is met for offloading a thermal load of the XR device;

identifying one or more edge processing devices within an environment of the XR device, wherein in response to identifying one or more edge processing devices within the environment of the XR device:

determining available memory resources of each of the one or more edge processing devices; and determining available processing resources of each of the one or more edge processing devices;

selecting at least one edge processing device of the one or more edge processing devices with sufficient memory and processing resources for balancing the thermal load of the XR device; and instructing the XR device to offload the thermal load to the selected at least one edge processing device.

13. The computer program product of claim 12, wherein determining that the condition is met for offloading the thermal load of the XR device includes:

comparing a temperature sensor value associated with the XR device within the thermal data to a temperature threshold; and determining that the condition is met in response to the temperature sensor value satisfying the temperature threshold.

14. The computer program product of claim 12, wherein determining that the condition is met for offloading the thermal load of the XR device includes:

comparing a biometric sensor value associated with a user of the XR device within the thermal data to a biometric data threshold; and determining that the condition is met in response to the biometric sensor value satisfying the biometric data threshold.

15. The computer program product of claim 14, wherein the biometric sensor value is a sweat analyte quantity value, wherein the biometric data threshold is a sweat analyte quantity threshold.

16. The computer program product of claim 12, wherein determining that the condition is met for offloading the thermal load of the XR device includes:

detecting at least one keyword associated with the condition uttered by a user of the XR device during XR usage; and determining that the condition is met in response to detecting the at least one keyword.

17. The computer program product of claim 12, wherein selecting the at least one edge processing device of the one or more of edge processing devices with sufficient memory and processing resources for balancing the thermal load of the XR device includes determining that the at least one edge processing device has a sufficient amount of available memory resources, a sufficient amount of available processing resources, and a sufficient amount of available network resources for balancing the thermal load of the XR device.

\* \* \* \* \*